Patented Feb. 19, 1929.

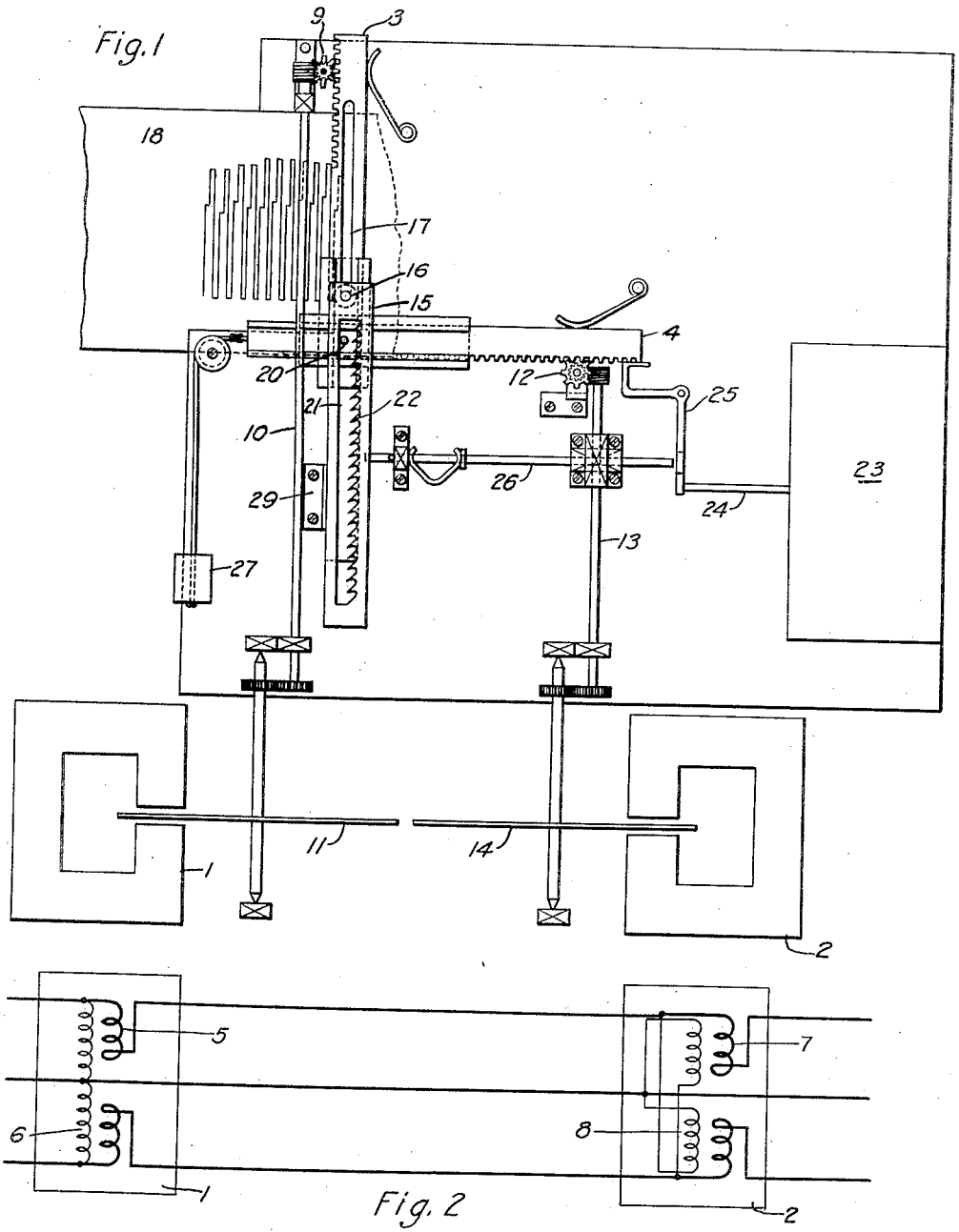

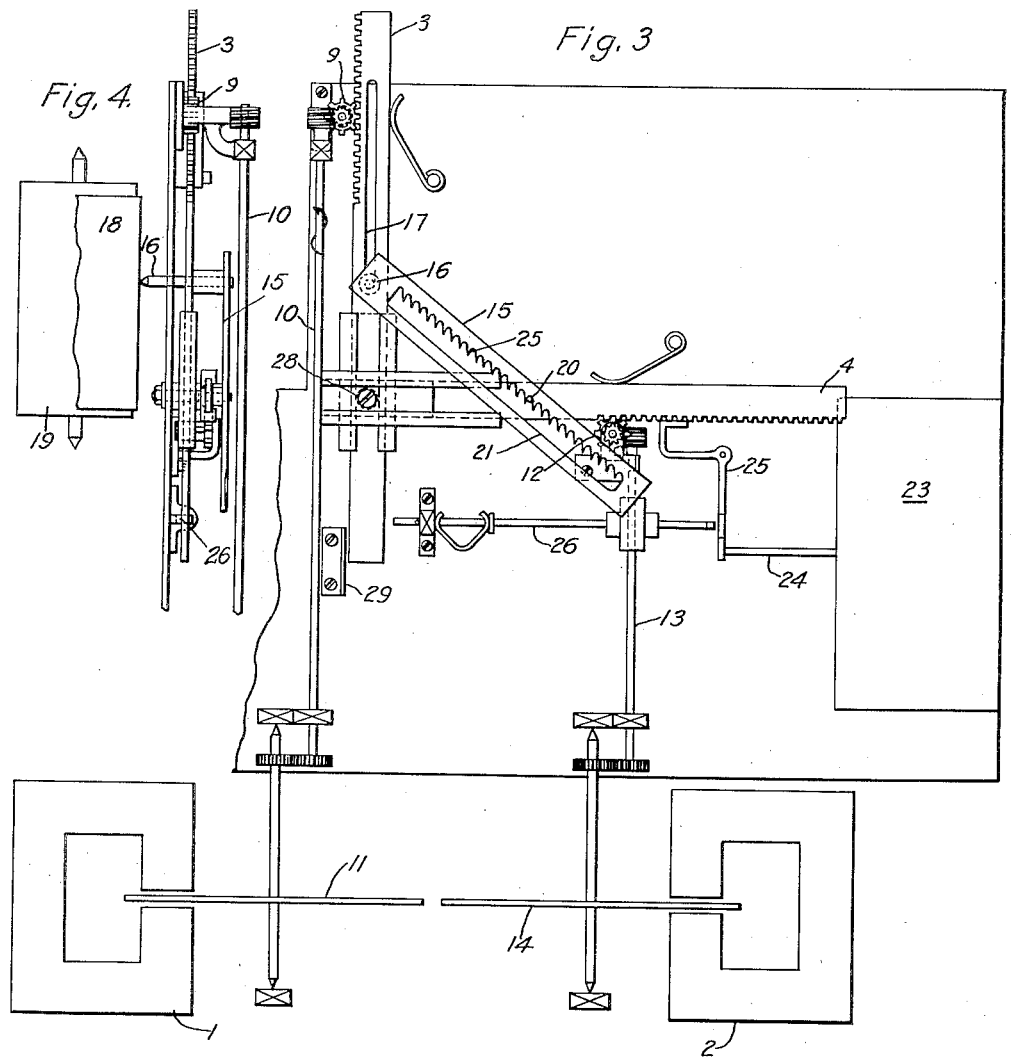

1,702,409

UNITED STATES PATENT OFFICE.

ALEX A. MORTON, OF CINCINNATI, OHIO, ASSIGNOR TO WESTINGHOUSE ELECTRIC AND MANUFACTURING COMPANY, A CORPORATION OF PENNSYLVANIA.

ELECTRIC METER.

Application filed April 25, 1924. Serial No. 708,898.

My invention relates to electrical meters and particularly to graphic volt ampere meters.

One object of my invention is to provide a graphic meter having a unitary structure for recording a plurality of correlated quantities.

Another object of my invention is to provide a recording instrument that shall have means for inscribing a single curve upon a record chart from which a number of correlated values may be read.

A further object of my invention is to provide a graphic meter that shall have means for recording the periodic integrated volt-ampere demand of an alternating current circuit.

A further object of my invention is to provide a graphic meter that shall have means for recording simultaneously watthour and volt-ampere-hour demands in a circuit.

In general terms, it is the object of my invention to provide an electrical measuring instrument for an alternatitng curent circuit of varying load and power factor from which all of the factors upon which the tariff charges for power are to be based may be readily and accurately obtained.

It is recognized that the tariff to be charged a consumer should be affected by numerous factors besides the energy used although it has been customary to base the charges upon this factor alone. For instance, the power factor of the load, the maximum demand and the time of the occurrence of the maximum demand all have a bearing upon the cost of generating the required power. Hence, it is desirable to be able to take account of each of these factors in arriving at the charge assessed. Heretofore, it has not been practicable to do this because of the difficulty or cost of metering loads to obtain these characteristics. According to my invention, however, an instrument is provided that is of simple and practical construction which enables any or all of the above mentioned quantities to be accurately determined.

In accordance with my invention, two watthour meter elements are connected to a single phase or polyphase circuit to be actuated, respectively, in accordance with the watt and the reactive volt-amperes. The meters are periodically connected to two movable members that are driven by the watt meters at right angles to each other. At the end of a predetermined period of time, the resultant movement of the two members is a measure of the volt-amperes taken from the line during the interval of time. A record is made upon a chart of the usual type of the watthour demand and of the volt-ampere-hour demand. The movable members are then restored to their normal positions and the operation is repeated. From the record on the chart, the maximum demand in watthours and volt-ampere-hours may be obtained and from these maxima, together with the total kilowatt-hours, the tariff charges may be equitably computed.

My invention may be readily understood upon reference to the accompanying drawings which illustrate a preferred embodiment thereof.

Fig. 1 is a view in elevation of a device constructed in accordance with my invention;

Fig. 2 is a diagram of the circuits of the meter;

Fig. 3 is a view similar to Fig. 1, with the elements in an operated position, and Fig. 4 is a side view of a portion of the device shown in Fig. 3.

The meter comprises, in general, two ordinary watthour meter elements 1 and 2, of the induction type, that drive two movable members 3 and 4, respectively, through the instrumentality of suitable gearing, as shown. The watthours meter 1 is connected to the circuit to be operated in accordance with the actual power consumed by the load. As shown in Fig. 2, when connected to a three-phase, three-wire circuit, the two current coils 5 are connected in series with two of the conductors of the circuit and the two voltage coils 6 are connected between the two said conductors and the third conductor. The watthour meter 2 is connected so that it is actuated in accordance with the reactive volt-amperes consumed by the load. As shown in Fig. 2, the current coils 7 are connected in series with the same two conductors of the line, but the connections of the voltage coils 8 are shifted in the usual way so as to obtain the proper phase relation to cause the watthour meter to be operated in accordance with the reactive volt-amperes.

The vertical member 3 is provided with teeth engaging a pinion 9, that is, in turn, driven by a shaft 10 in such manner that the member 3 is raised by the rotation of the disc 11 of the watthour meter 1 at a rate which is proportional to the energy consumed by the load.

Likewise, the horizontal member 4 is provided with teeth engaging a pinion 12 that is driven by a shaft 13 in such manner that the member 4 is driven from left to right at a rate proportional to the speed of rotation of the disc 14 of the watthour meter 2.

A rectangular plate 15 is provided with a recording element or stylus 16 projecting through a slot 17 in the member 3. The stylus 16 normally rests at the lower end of the slot 17 so that the upward movement of the member 3 raises the stylus 16 and the plate 15. The stylus 16 engages a recording chart 18 that is carried by a drum 19 which is driven by the usual clock-work or motor mechanism 23, which may be similar to that shown in the U. S. Patent to Bradshaw and Mylius, No. 1,336,611, dated April 13, 1920 and assigned to the Westinghouse Electric and Manufacturing Company.

The member 4 carries a pin 20 that projects through a slot 21 in the plate 15 in such manner that the movement of the member 4 in a transverse direction will produce an angular rotation of the plate 15, as shown in Fig. 3. The right-hand side of the slot 21 is provided with teeth 22 that are adapted to cooperate with the pin 20.

In the operation of the meter, the two driving elements 1 and 2 move the members 3 and 4 simultaneously until at the end of a predetermined interval of time,—for instance, fifteen minutes,—the parts have assumed a position similar to that shown in Fig. 3. The stylus 16, during this interval, has traced a vertical line upon the chart 18 proportional to the total watthour demand of the load as registered by the meter 1. During this interval of time, the chart has remained stationary. The clock mechanism 23 now operates to move the chart 18 so as to make a horizontal mark which indicates the vertical distance which the stylus 16 has travelled during the demand interval (see Fig. 1). The mechanism 23 next operates a resetting rod 24 to actuate a bell crank lever 25 to lift the member 4 out of engagement with the pinion 12.

The resetting rod 24 moves relatively slowly and a small interval of time elapses before it causes the disengagement of the member 3 from the pinion 9 through the instrumentality of a rod 26. The member 4 is, therefore, first returned to normal by a weight 27. In the return of the member 4 to normal, the pin 20, by reason of its engagement with one of the teeth 22, carries the stylus 16 up the slot 17. It will be apparent that, when the plate 15 has reached the vertical position, the stylus 16 will have been raised above the horizontal axis of member 4 a distance equal to the hypotenuse of the triangle formed by the members 3, 4 and 15 (Fig. 3). A second vertical line is inscribed on the chart 18 therefore, and, upon the further movement of the chart 18, the total vertical travel of the stylus 16 is recorded by a second horizontal mark. This total travel is the resultant of the travel of the members 3 and 4 or the volt-ampere-hour demand during the interval of time.

The restoring rod 26 now disengages the member 3 from the pinion 9 by rocking it about a pivot 28, and the engagement of the plate 15 with the stop 29 causes the disengagement of the pin 20 from the teeth 22, whereupon the plate 15 and the member 3 return to their normal positions under the influence of gravity.

This operation is repeated at fixed time intervals thereby recording the maximum demand during any one of a number of relatively short intervals upon the chart 18, as shown in Fig. 1.

Since the travel of the member 3 is proportional to the power demand of the load and the travel of the member 4 is proportional to the reactive volt-ampere demand, it may be shown that the resultant movement, as represented by the hypotenuse of the right triangle of which these two quantities are the sides at right angles, is proportional to the volt-ampere demand of the load. This is recorded upon the chart 18 by the stylus 16 as described above. From the record so obtained it is possible to assess tariff charges which are adjusted in accordance with both the maximum kilowatt-hour and volt-ampere-hour demands. This is desirable because these maximum demands affect the generating station capacity required inasmuch as the capacity must be great enough to take care of the maximum volt-ampere-demand, and not merely the average energy demand. The average power factor for the demand period may be readily computed from the watthour demand and the volt-ampere-hour demand.

It will be apparent that I have provided an instrument of simple and practical construction from which a permanent record of the varying load and power factor characteristics of a load may be obtained. I do not consider my invention limited to the precise construction shown in the accompanying drawings inasmuch as various modifications thereof may be made within the scope of my invention as defined by the appended claims.

I claim as my invention:

1. A meter comprising two actuating elements of the integrating type, a stylus, means including one of said elements for gradually moving said stylus from an initial position for a predetermined demand interval in accordance with a function of the integrated quantity measured by said element, means operative at the end of said demand interval for moving said stylus to a position corresponding to a function of both of the integrated quantities measured by said elements over the preceding demand interval and means for thereafter resetting the stylus to the initial position.

2. A meter comprising an actuating element of the integrating type, a stylus, means including said actuating element for gradually moving said stylus from an initial position for a predetermined demand interval, means operative at the end of said demand interval for moving said stylus to another position corresponding to the magnitude of an electrical quantity integrated over the preceding demand interval and for thereafter resetting the stylus to the initial position.

3. In combination, a line, a first wattmeter element responsive to the power component of said line, a second wattmeter element responsive to the reactive component of said line, a chart, a member actuated by said power component element alone, a member actuated by both said elements and means including said elements and members for tracing a single curve on said chart showing the simultaneous volt-ampere-hour and watt-hour demands of said line.

4. A meter comprising two actuating elements of the integrating type, a stylus, means including one of said elements for gradually moving said stylus from an initial position for a predetermined demand interval in accordance with a function of the integrated quantity measured by said element, means operative at the end of said demand interval for quickly moving said stylus to a position corresponding to a function of both of the integrated quantities measured by said elements over the preceding demand interval and means for thereafter resetting the stylus to the initial position.

5. The combination with two members movable from a point at right angles to each other in accordance with correlated quantities for a predetermined interval of time, of a third member cooperatively actuated by said members to have a length equal to the resultant of the movements of said two members and means including said third member for recording the said length.

6. The combination with two members movable from a point at right angles to each other in accordance with correlated quantities for a predetermined interval of time, of a third rigid member cooperatively actuated by said members to have a length equal to the resultant of the movements of said two members, means for tracing a curve in accordance with the movement of one of said members, and means including said third member for continuing said curve in a substantially similar direction in accordance with the length of said resultant.

7. A recorder comprising a chart, a stylus cooperating with said chart, members movable in angular relation to each other, means for driving said members, and means whereby at the end of a predetermined time said stylus and chart record the movement of one of said members and the vectorial sum of the movements of both of said members.

8. A recorder comprising a chart, a stylus cooperating with said chart, members movable in angular relation to each other, means for driving said members, and means whereby at the end of a predetermined time said stylus and chart make a simple curve showing the movement of one of said members and the vectorial sum of the movements of both of said members.

9. A recorder comprising a chart, a stylus cooperating with said chart, members movable in angular relation to each other, means for driving said members, and means whereby at the end of a predetermined time said stylus and chart make a curve having a plurality of substantially parallel sections indicative of the movement of one of said members and the vectorial sum of the movements of both of said members.

10. In a recording device, the combination with a plurality of members movable in different directions, for a predetermined time, of another member actuated by said members to have a portion thereof equal in length to the resultant movement of said members, and means including a chart and a stylus for making a mark indicative of both the length of movement of one of said members and the length of said portion.

11. In a recording device, the combination with a plurality of members movable in different directions for a predetermined time, of another member actuated by said members to have a portion thereof equal in length to the resultant movement of said members, and means including a chart and stylus for making a simple curve having offset substantially parallel portions indicative of both the length of said portion and the movement of one of said members.

12. A recording device comprising two elements movable in substantially straight lines at right angles to each other, means for driving said elements for an interval of time, a member moved conjointly by said two elements, a stylus moved by one of said elements for said interval of time and then by said member in substantially the same direction to a position indicative of the resultant movement of said two elements, and means including a chart for recording said movements of said stylus.

13. A recording device comprising a movable rack having a lateral slot, a second rack having one end pivotally supported in said slot, a third rack having a portion slidably engaging said second rack movable at substantially right angles to said first rack, means for moving said first and third racks conjointly for a predetermined interval of time, a stylus mounted on said pivot end of said second rack, a chart marked by said stylus, means for moving said chart a small distance at the end of said interval, means for returning said third rack to an initial position after movement of said paper while said first named rack is in an extreme forward position, and means for returning said first rack to an initial position.

14. A recording device comprising a movable slotted member, a rack having a pivotal member disposed in said slot, a movable pin cooperating with said rack to limit relative movement therein in one direction, means for driving said slotted member and said pin conjointly in accordance with related quantities for a predetermined time, means for returning said pin to an initial position at the end of said time whereby said pivotal member is moved in said slot by said rack to a position indicative of the length from said pivotal member to said pin, and means including a stylus and chart for recording the movement of said pivotal member.

15. In a recording device, the combination with two members movable at right angles to each other, of a third member pivoted to one of said members and slidably engaging the other of said members, a chart, and a stylus for marking said chart in accordance with the length of movement of one of said members and in accordance with the length of said third member between said two members, after a predetermined time.

16. In a recording device, the combination with a rigid member, of means for simultaneously moving the member for a predetermined time under the influence of a plurality of directional forces, means for recording the length of movement of one of said forces, and means including said member for recording the length of the resultant of said forces.

17. A meter including two elements movable in accordance with the magnitude of two quantities to be measured, a third element operatively associated therewith, means for moving said third element in accordance with the magnitude of one of said quantities for a predetermined time, and means operable at the expiration of that time for moving said third element in accordance with the vectorial sum of said two quantities.

In testimony whereof, I have hereunto subscribed my name this fifth (5th) day of April, 1924.

ALEX A. MORTON.